R. CLARK.
PIPE COUPLING.
APPLICATION FILED JULY 10, 1912.
1,059,438.
Patented Apr. 22, 1913.
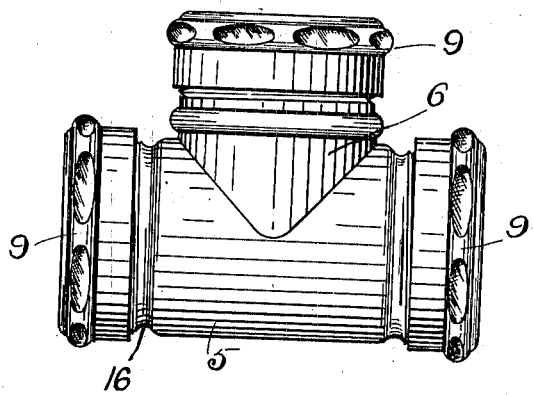
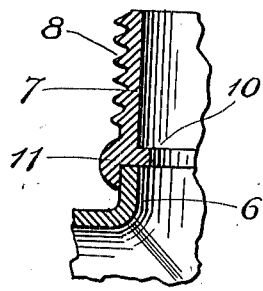
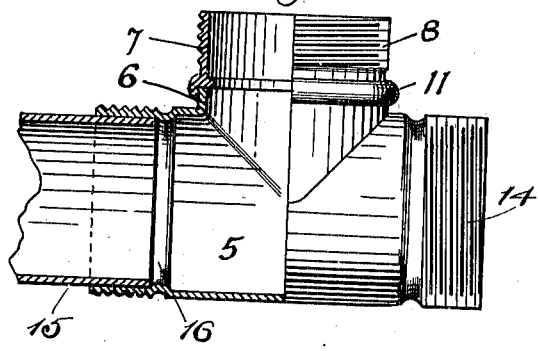
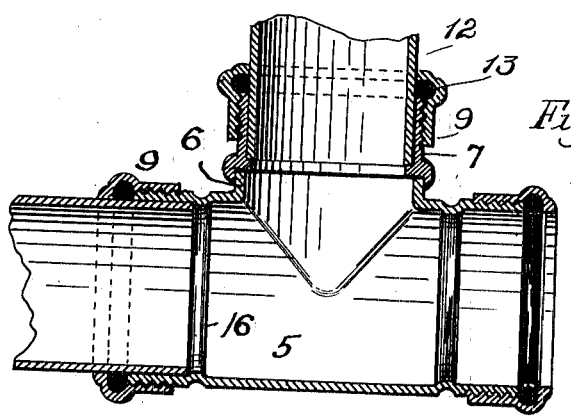
WITNESSES:
J. S. Coleman
M. O. Williams
INVENTOR:
Robert Clark,
BY
Beach & Fisher
ATTORNEYS.

UNITED STATES PATENT OFFICE.

ROBERT CLARK, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

PIPE-COUPLING.

1,059,438.  Specification of Letters Patent.  Patented Apr. 22, 1913.

Application filed July 10, 1912. Serial No. 708,587.

*To all whom it may concern:*

Be it known that I, ROBERT CLARK, a citizen of the United States, residing in Bridgeport, county of Fairfield, and State of Connecticut, have invented certain new and useful Improvements in Pipe-Couplings, of which the following is a full, clear, and exact description.

This invention relates to pipe couplings, and has special reference to means for coupling a pipe to a branch wrought from the intermediate portion of a sheet metal body or union to form a T. The invention is not limited in all of its aspects, however, to the connection of a pipe to a T body, as the character of the main portions of the two bodies to be connected is more or less immaterial.

The primary object of the invention is to provide a very strong and durable connection between a part such as a wrought branch in a T, and an intermediate supplemental section set on said branch for the purpose of securing a pipe or other member thereto, the means for reinforcing the joint between the branch and the supplemental section having the additional function of positioning the pipe properly with respect to the T or other member.

To this and other ends the invention consists in the novel features and combinations of parts to be hereinafter described and claimed.

In the accompanying drawing, Figure 1 is a side elevation of the T body with the nuts in place on the respective branches, Fig. 2 is a view partly in elevation and partly in section, with the nuts removed. Fig. 3 is a vertical longitudinal section of the device with two of the couplings completed, and Fig. 4 is a detail sectional view of one of the branches of the T body.

Referring to the drawing, 5 indicates a T body formed of sheet metal, having an integral tubular branch 6. On top of the open branch 6 is placed a separate supplemental section 7, as shown in Fig. 4. This section is of sleeve-like form and is provided with exterior screw threads 8 on which a nut 9 is screwed. The sleeve-like body of the section 7 has approximately the same internal diameter as the branch 6. At its lower extremity it is projected laterally beyond the upper edge of the branch 6 to form at one side an internal shoulder 10, and at the opposite or outer side it presents a bead 11. The section 7 is secured to the branch 6 by having its bottom edge placed directly on the top edge of the branch 6, after which the bead 11 is clenched against the adjacent portion of the branch 6, the connection being completed by the use of solder. In this manner a very simple and inexpensive connection is made. The shoulder 10, projecting inwardly from the section 7 at the lower edge of the latter and overhanging the top edge of the upwardly extending branch of the T body, provides a seat for a pipe 12 set in the section 7, as shown in Fig. 3. The pipe 12 is thereby effectively supported on the shoulder or flange 10 and it is held in place by means of the nut 9 which compresses a gasket 13 against the outer surface of the pipe in a well known manner. The shoulder 10, which is preferably squared off at the top and bottom, not only has the function of supporting the pipe 12 in the proper position with respect to the T, but also of strengthening very materially the joint between the branch 6 and the supplemental section. This arises from the fact that by the construction described the lower end or base of the supplemental section, where the latter rests on the branch 6, is materially thicker than the wall of said branch and overhangs the latter at opposite sides, as shown in Fig. 4. Hence the supplemental section has a firm and substantial bearing on the branch, and in case solder is used in making the connection, as described, it will be obvious that the comparatively extensive surfaces of the branch and section which are located close to or in contact with each other form a substantial anchor for the adhesive material.

The two ends of the T body are provided with threaded portions 14, which may be spun in the sheet metal, and on these threaded portions are fitted nuts 9 similar to that previously mentioned. In this case the pipe 15 (Fig. 2) is positioned in the mouth of its corresponding branch by means of a stop bead 16 formed integrally with the wall of the T by spinning. This bead projects inward at a suitable distance from the mouth of the corresponding branch in order to engage the edge of the pipe 15 and thereby limit the extent to which the pipe may be shoved into the T body, as will be understood. The spun bead 16 forms an especially inexpensive yet effective form of stop.

In assembling the parts, as shown in Fig. 3, the pipes 12 and 15 are thrust into their respective branches until the edges of said pipes abut the respective stop members. The nuts 9 engage the threads of the respective branches in order to compress the gaskets against the respective pipe sections. The assemblage is very easy and yet the parts are accurately positioned so that the T joint will operate without leakage and without obstruction caused by the displacement of the pipe ends in an inward direction.

Without limiting myself to the precise construction shown I claim:

1. In a pipe coupling, the combination with a pipe, and a tubular member with which it is to be connected, having an open end, of a supplemental section formed of a sleeve-like body seated on the open end of said tubular member, said section having a base portion thicker than the mouth portion of the tubular member on which it rests and constituted by an exterior bead extending over the outer surface of the tubular member, and a shoulder projecting inwardly from said section immediately above the mouth of said tubular member to reinforce the joint and to seat the pipe in said section, and a nut on said section to secure the pipe therein; substantially as described.

2. As an article of manufacture, a sheet metal T body having a branch wrought therein and provided with an open end or mouth, in combination with a supplemental section having a base portion of greater thickness than and seated on the mouth of said branch, said base portion being constituted by a bead extending over the outer surface of said branch, and by a shoulder projecting inward from the section immediately adjacent the joint between the latter and the branch and overhanging the mouth of the branch at the inside; substantially as described.

3. As an article of manufacture, a sheet metal T body having a branch wrought therein and provided with an open end, in combination with a supplemental section having a widened base set on the open end of said branch and constituted by a bead extending over the outer surface of the branch, and a squared off shoulder projecting inward beyond the inner surface of said section approximately in line with said bead and affording a stop for a pipe inserted in said section; substantially as described.

4. As an article of manufacture, a sheet metal T body having a branch wrought therein and provided with an open end or mouth, in combination with a supplemental section having a base resting on and of greater width than the mouth of said branch, said base being constituted by a bead at the outside of the section extending over the outer surface of the branch, and a shoulder projecting inward from the inner surface of said section approximately in line with said bead, said shoulder being squared off at the bottom to make a substantial joint with the branch, and squared off at the top to seat a pipe in said section; substantially as described.

In witness whereof, I have hereunto set my hand on the 9th day of July, 1912.

ROBERT CLARK.

Witnesses:
  HENRY E. ROCKNELL,
  SAMUEL H. FISHER.